(12) United States Patent
Han et al.

(10) Patent No.: US 8,223,734 B2
(45) Date of Patent: Jul. 17, 2012

(54) APPARATUS AND METHOD FOR TRANSMITTING AND RECEIVING FORWARD SHARED CONTROL CHANNEL IN A MOBILE COMMUNICATION SYSTEM

(75) Inventors: Jin-Kyu Han, Seoul (KR); Yong-Jun Kwak, Yongin-si (KR); Hwan-Joon Kwon, Suwon-si (KR); Ju-Ho Lee, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 1103 days.

(21) Appl. No.: 12/031,153

(22) Filed: Feb. 14, 2008

(65) Prior Publication Data

US 2008/0225964 A1 Sep. 18, 2008

(30) Foreign Application Priority Data

Feb. 14, 2007 (KR) .......... 10-2007-0015361
Mar. 29, 2007 (KR) .......... 10-2007-0031162

(51) Int. Cl.
*H04B 7/216* (2006.01)
(52) U.S. Cl. .......... 370/342; 370/441; 370/479
(58) Field of Classification Search .......... None
See application file for complete search history.

(56) References Cited

U.S. PATENT DOCUMENTS

| 7,164,650 | B2 | 1/2007 | Kim et al. | |
| 7,778,307 | B2 * | 8/2010 | Kuchibhotla et al. | 375/145 |
| 2003/0202500 | A1 * | 10/2003 | Ha et al. | 370/342 |
| 2008/0049692 | A1 * | 2/2008 | Bachu et al. | 370/338 |
| 2010/0027697 | A1 * | 2/2010 | Malladi et al. | 375/260 |
| 2011/0055654 | A1 * | 3/2011 | Palanki | 714/749 |

FOREIGN PATENT DOCUMENTS

| JP | 11-098552 | 4/1999 |
| JP | 2003-143108 | 5/2003 |
| WO | WO 2006/069300 | 6/2006 |
| WO | WO 2006/099349 | 9/2006 |

OTHER PUBLICATIONS

Sarkar et al., "MIMO Design for LBC-FDD", C30-20060911-072_QCOM_MIMO Design, 3GPP2, Sep. 11, 2006.

* cited by examiner

*Primary Examiner* — Anh-Vu H Ly
*Assistant Examiner* — Tito Pham
(74) *Attorney, Agent, or Firm* — The Farrell Law Firm, P.C.

(57) ABSTRACT

A method is provided for transmitting a downlink shared control channel including a control signal necessary for restoring a transmission data signal in a mobile communication system that transmits a data signal using multiple antennas. It is determined whether the transmission data signal is coded with two or more codewords before being transmitted. One of a first element index of a sub-codebook configured only with a one codeword-dedicated precoding in a precoding codebook and a second element index of a sub-codebook configured only with a more-than-two codeword-dedicated precoding is selected, according to the determination result. A control channel is generated by including the selected element index in the precoding information. The generated control channel is mapped to a particular resource block and the mapped control channel is transmitted to a particular reception apparatus.

21 Claims, 8 Drawing Sheets

APPARATUS AND METHOD FOR TRANSMITTING AND RECEIVING FORWARD SHARED CONTROL CHANNEL IN A MOBILE COMMUNICATION SYSTEM

PRIORITY

This application claims priority under 35 U.S.C. §119(a) to a Korean Patent Application filed in the Korean Intellectual Property Office on Feb. 14, 2007 and assigned Serial No. 2007-15361, and a Korean Patent Application filed in the Korean Intellectual Property Office on Mar. 29, 2007 and assigned Serial No. 2007-31162, the disclosures of which are incorporated herein by reference.

BACKGROUND OF THE INVENTION

1. Field of the Invention

The present invention relates generally to a mobile communication system, and more particularly, to an apparatus and method for transmitting and receiving a Forward Shared Control Channel (F-SCCH) in a mobile communication system supporting a multi-antenna technology.

2. Description of the Related Art

Mobile communication systems are developing into high-speed, high-quality wireless packet data communication systems in order to provide data services and multimedia services beyond voice-oriented services.

Recently, various mobile communication standards, such as High Speed Downlink Packet Access (HSDPA) and High Speed Uplink Packet Access (HSUPA) proposed by $3^{rd}$ Generation Partnership Project (3GPP), High Rate Packet Data (HRPD) proposed by 3GPP2, and 802.16 proposed by IEEE, are being developed to support high-speed, high-quality wireless packet data transmission services.

The $3^{rd}$ generation wireless packet data communication systems, such as the above-stated HSDPA, HSUPA and HRPD, use such technologies as an Adaptive Modulation and Coding (AMC) method and a Channel-Sensitive Scheduling method to improve transmission efficiency.

With the use of the AMC method, a transmission apparatus can adjust the amount of transmission data according to the channel state. That is, in a poor channel state, the transmission apparatus reduces the amount of transmission data to decrease a reception error probability to a desired level. In a good channel state, the transmission apparatus increases the amount of transmission data to increase the reception error probability to a desired level, thereby ensuring efficient information transmission.

In addition, with the use of the Channel-Sensitive Scheduling resource management method, the transmission apparatus selectively services a user having a superior channel state among several users, thereby contributing to an increase in the system capacity, compared to the case where the transmission apparatus allocates a channel to one user and services the corresponding user. Such an increase in system capacity is called 'multi-user diversity gain'.

In sum, the ACM method and the Channel-Sensitive Scheduling method are methods in which the transmission apparatus applies a suitable modulation and coding technique at the most efficient time determined based on partial channel state information fed back from a reception apparatus.

To implement the ACM method and the Channel-Sensitive Scheduling method, the reception apparatus should feed back channel state information to the transmission apparatus. The channel state information fed back by the reception apparatus is called a Channel Quality Indicator (CQI).

Recently, intensive research has been conducted to replace Code Division Multiple Access (CDMA), the multiple access scheme used in the $2^{nd}$ and $3^{rd}$ mobile communication systems, with Orthogonal Frequency Division Multiple Access (OFDMA) in the next generation system.

In this context, 3GPP and 3GPP2 are presently discussing the standardization for the evolved system using OFDMA. The evolved system using OFDMA, compared to the system employing CDMA, can expect an increase in the system capacity.

One of several reasons that the OFDMA scheme results in a capacity increase is that the OFDMA scheme can perform scheduling in the frequency domain (hereinafter referred to as 'Frequency Domain Scheduling'). That is, although capacity gain was obtained through the Channel-Sensitive Scheduling method using the characteristic that a channel varies with the passage of time, higher capacity gain can be obtained with the use of the characteristic that a channel varies according to the frequency.

However, in order to support Frequency Domain Scheduling, the transmission apparatus should previously acquire channel state information separately for each frequency. In this case, since there is a need for CQI feedback separately for each frequency, the reception apparatus and the transmission apparatus may suffer from an increase in the signaling load due to transmission/reception of the CQI feedback.

In the next generation system, studies have been made regarding the introduction of a Multiple Input Multiple Output (MIMO) technology using multiple transmit/receive antennas. The MIMO technology is a technology that simultaneously transmits multiple data streams over the same resources using multiple transmit/receive antennas. It is known that the MIMO technology is a method that can increase transmission throughput at the same error probability by transmitting multiple low-modulation order data streams rather than increasing a modulation order in the good channel state. In the MIMO technique, a dimension where an individual data stream is transmitted is called a layer, and a method of separately applying AMC according to the channel state of each layer can contribute to an increase in the entire system capacity.

For example, Per Antenna Rate Control (PARC) is a technology in which every transmit antenna transmits a different data stream, and in this technology, the layer is each transmit antenna. In this case, each of the multiple transmit antennas may experience a different channel, and the PARC technique applies AMC so as to transmit more data via a transmit antenna(s) having a good channel state, and reduces the amount of data transmitted via a transmit antenna(s) having a poor channel state.

As another example, there is Per Common Basis Rate Control (PCBRC), and in the PCBRC technology, the layer is a fixed transmission beam. Therefore, the PCBRC technique transmits more data over a transmission beam(s) having a good channel state, and reduces the amount of data transmitted over a transmission beam(s) having a poor channel state.

When MIMO is implemented using multiple antennas, a precoding method is used to adaptively form transmission beams according to the channel state. The term 'precoding' as used herein refers to an operation in which the transmission apparatus previously distorts a transmission signal in the step before it transmits the signal via a transmit antenna. When precoding is implemented by linear combining, the precoding process can be expressed by Equation (1).

$$x = Es \qquad (1)$$

In Equation (1), 's' is a K×1 vector and denotes a desired transmission signal, and 'x' is an M×1 vector and denotes an actual transmission signal. Further, 'K' denotes the number of symbols simultaneously transmitted over the same resources by MIMO, and 'M' denotes the number of transmit antennas. In addition, 'E' is an N×K matrix, and denotes precoding. That is, Equation (1) expresses a preceding scheme E applied when a MIMO transmission apparatus with M transmit antennas simultaneously transmits K signal streams.

A precoding matrix E is adaptively determined according to a MIMO transmission channel. However, the transmission apparatus, when it has no information on the MIMO transmission channel, performs precoding according to the feedback information reported by the reception apparatus. To this end, a precoding codebook including a finite number of precoding matrixes E should be previously set between a transmitter and a receiver, and stored therein. Therefore, the reception apparatus should select a precoding matrix E most preferred in the current channel state from the previously stored precoding codebook taking the current channel state into account, and feed back information on the selected precoding matrix E to the transmission apparatus. Then the transmission apparatus performs MIMO transmission by applying precoding based on the received feedback information for the precoding matrix E.

Regarding the transmission signal of Equation (1), a signal received at the reception apparatus after experiencing a MIMO channel H is defined by Equation (2).

$$y = Hx + z = HEs + z \quad (2)$$

In Equation (2), 'y' and 'z' are both an N×1 vector, and denote a signal and a noise received at N receive antennas, respectively, and 'H' is an N×M matrix, and denotes a MIMO channel. The received signal undergoes a reception combining process so that a Signal-to-Interference and Noise Ratio (SINR) for a transmission signal stream of each layer may be improved. A signal r, after undergoing the reception combining process, is defined by Equation (3).

$$r = Wy = WHx + Wz = WHEs + Wz \quad (3)$$

In Equation (3), 'W' is an N×N matrix and denotes a reception combining process, and 'r' is an N×1 signal vector. In order to better receive a transmission signal stream of each layer, a reception technique such as interference cancellation and/or Maximum Likelihood (ML) reception can also be used.

A Single-Code Word (SCW) scheme and a Multi-Code Word (MCW) scheme are distinguishable according to the number of coded packets from which multiple signal streams transmitted by the MIMO technique are generated.

In the SCW scheme, one codeword is transmitted over multiple layers made by the MIMO technique regardless of the number of layers, and the MCW scheme transmits one different codeword over each of multiple layers made by the MIMO technique.

The MCW scheme is advantageous in that a receiving side can obtain additional gain by way of a reception process such as interference cancellation. This is because the reception apparatus can determine the success/failure in decoding of each codeword using a Cyclic Redundancy Check (CRC) applied to each codeword. However, the MCW scheme, as it increases the number of transmission codewords, wastes additional resources that it linearly increases to apply CRC, and also increases the complexity of the reception apparatus.

A Dual CodeWord (DCW) scheme is compromised to obtain a rate improvement effect of the MCW scheme while compensating for the above drawbacks. In the DCW scheme, a maximum of two codewords are transmitted over multiple layers made by the MIMO technique regardless of the number of layers.

FIG. 1 illustrates an exemplary structure of an SCW MIMO transmission/reception apparatus to which the present invention is applied.

Referring to FIG. 1, a desired transmission data stream is converted into one coded packet signal stream after undergoing a channel coding and modulation process 101. For MIMO transmission, the signal stream is demultiplexed at a demultiplexer 103 into K signal streams. The K demultiplexed signal streams are reshaped into M signal streams to be transmitted via their associated transmit antennas by means of a precoder 105. This process is provided so that K signal streams are transmitted over different transmission beams.

The M precoded signal streams are transmitted via transmit antennas 109a-109m by way of transmission processors 107a-170m, respectively. The transmission processors 107a-170m include not only the process of generating CDMA and/or OFDMA signals and but also the filtering and/or Radio Frequency (RF) processing process performed in their associated antennas.

The transmitted signals are received at N receive antennas 111a-111n, and the signals received via the receive antennas are restored into baseband signals by means of reception processors 113a-113n, respectively. After the reception-processed signals are converted into K signal streams by means of a reception combiner 115, the K signal streams are restored into one desired transmission signal stream after undergoing multiplexing in a multiplexer 117. Finally, the restored signal stream is restored into a desired transmission data stream by means of a demodulation and channel decoding unit 119.

As described above, in the SCW MIMO scheme, because the transmission apparatus generates multiple transmission signal streams using one channel coding and modulation process 101, it only needs to receive one CQI feedback. However, the number of MIMO transmission signal streams, i.e., the number K of MIMO layers over which the signal streams are transmitted, should be adjusted according to the channel state. The number K of MIMO transmission layers over which signal streams are transmitted is referred to herein as a 'Rank'. Therefore, the SCW MIMO feedback information is composed of one CQI representative of a channel state of a MIMO transmission layer, and the number Rank of transmission layers, required according to the channel state.

FIG. 2 illustrates an exemplary structure of a DCW MIMO transmission/reception apparatus to which the present invention is applied.

Referring to FIG. 2, in the DCW MIMO scheme, unlike in the SCW MIMO scheme, two different coded packet signal streams are transmitted over a MIMO layer.

A desired transmission data stream is demultiplexed at a demultiplexer 201 into two data streams, and the demultiplexed data streams are converted into modulation signal streams after undergoing different channel coding and modulation processes 201-1 and 201-2, respectively. The succeeding transmission process is the same as that of the SCW MIMO scheme, and the modulation signal streams are converted into signals to be transmitted via M transmit antennas 209a-209m, after undergoing a precoding process at a precoder 205 and transmission processing at transmission processors 207a-207m for their associated transmit antennas.

A DCW MIMO reception process is also the same as the SCW MIMO reception process in several steps immediately after signal reception. In particular, although the reception apparatus of FIG. 2 uses an interference canceller 21-, by way of example, it can use a reception method of another type.

Signal received via N receive antennas 211a-211n are restored into transmission signals associated with corresponding layers after undergoing reception processors 213a-213n, and a reception combiner 215 in sequence. The restored signals include interference to/from each other. In DCW MIMO, because the transmission signals underwent different coding and modulation separately for each layer, a receiver can remove the first restored signal of a particular layer to cancel the interference that the signal exerts on another layer.

The use of the interference canceller 219 can improve channel capacities of MIMO layers, making it possible to transmit more data through DCW MIMO transmission. An interference cancellation-based reception process will be described below. When one modulation signal stream is successfully restored through demodulation and channel decoding 217, the reception process cancels interference using the restored signal at interference canceller 219. The interference-canceled signal stream 223 is delivered back to the demodulation and channel decoding unit 217 where based thereon, it restores a second modulation signal stream. Finally, the two restored data streams are restored into one desired transmission data stream after undergoing multiplexing at multiplexer 221.

The MCW MIMO transmission/reception apparatus is not so different from the DCW MIMO transmission/reception apparatus in structure. The transmission apparatus supporting MCW MIMO transmits a different codeword separately for each MIMO layer made through precoding, and the reception apparatus supporting MCW MIMO cancels the interference contributed by the first restored signal stream in order of the first restored signal stream while performing demodulation and channel decoding separately for each layer, and repeatedly performs interference cancellation, and demodulation and channel decoding thereon until the interference is fully canceled. Since an operation of MCW MIMO can be simply analogized by extending the operation of DCW MIMO, a detailed description thereof will be omitted herein for simplicity.

A downlink (DL) control channel will be described below. A DL control channel is a channel including the control information that a terminal (or User Equipment (UE)) needs to restore a signal transmitted from a base station. Generally, the downlink control channel includes the following information.

1. User Equipment Identification (UE ID): UE ID is information based on which a terminal determines the presence of a signal being transmitted to the terminal itself. Since a CRC based on a particular UE ID is generally inserted into DL control information, if the terminal has successfully restored the DL control information, it recognizes the corresponding control information as information for the corresponding terminal.

2. Down Link Resource Block (DL RB) allocation information: If the terminal has successfully restored the DL control information, it determines based on the DL RB information over which resource block its actual data is transmitted.

3. Transport Format (TF): TF indicates a modulation and coding scheme of transmission signal. A terminal, if it uses AMC, should have TF information in order to perform a demodulation and channel decoding process.

4. Hybrid Automatic Repeat Request (HARQ) related information: HARQ is an operation in which a receiver transmits, to a transmitter, information indicating the success/failure in reception of a transmission packet. The transmitter transmits another packet when the receiver has succeeded in the packet reception, and the transmitter retransmits the previous packet when the receiver has failed in the packet reception. The term 'HARQ-related information' as used herein refers to information related to HARQ indicating whether a transmission signal is an initial transmission signal or a retransmission signal. Based on this, the terminal determines whether it will combine the received packet with the previously received packet and perform decoding thereon, or it will newly perform a decoding operation.

In MIMO transmission, aside from the 4 types of information stated above, additional information can be transmitted over a DL control channel. For example, when precoding is applied, the additional information can be precoding information because there is a need to provide the terminal with information indicating which precoding scheme is applied.

Therefore, in SCW MIMO transmission to which precoding is applied, the necessary DL control channel information should include not only the UE ID, DL RB, TF and HARQ-related information, but also the precoding information.

In DCW MIMO transmission to which precoding is applied, because the number of transmission codewords is 2, the TF and HARQ-related information corresponding to each codeword should be transmitted. That is, the DL control channel information necessary for DCW MIMO transmission to which precoding is applied, includes UE ID, DL RB, TF #1 (TF of a first codeword), TF #2 (TF of a second codeword), HARQ-related information #1 (HARQ-related information of the first codeword), HARQ-related information #2 (HARQ-related information of the second codeword), and precoding information.

Herein, the precoding information, which is information indicating which precoding matrix is applied, includes codeword mapping information between the layer configured through precoding, and the transmission codeword.

A description will now be made of a method for configuring a DL control channel for MIMO transmission to which precoding is applied.

FIG. 3 illustrates DL control channel information for SCW MIMO, to which the present invention is applied.

Referring to FIG. 3, it can be appreciated that the DL control channel information includes UE ID 301, DL RB 303, precoding information 305, TF 307, and HARQ-related information 309, wherein the order of the information is meaningless. If predefined synchronized HARQ is applied for a retransmission time and resources required for retransmission, the HARQ-related information 309 can be omitted.

FIG. 4 illustrates DL control channel information for DCW MIMO, to which the present invention is applied.

Referring to FIG. 4, it can be appreciated that the DL control channel information includes UE ID 401, DL RB 403, precoding information 405, TF #1 407-1, HARQ-related information #1 409-1, TF #2 407-2, and HARQ-related information #2 409-2. Similarly, the order of the information is meaningless, and if synchronized HARQ is applied, the HARQ-related information 409-1 and 409-2 can be omitted.

When the TFs and HARQ-related information, the number of which corresponds to the number of codewords, are acquired as shown in FIG. 4, the general DL control channel information for MCW MIMO can be configured.

Even in the situation where an agreement to perform DCW MIMO transmission is made between a transmitter and a receiver, if the number of activated layers is 1, only one codeword is transmitted. A technique of adaptively adjusting the number of activated layers according to the state of a MIMO channel in this way is called 'Rank Adaptation technique'. When an SINR is low or a correlation between channels is high, even though it is possible to configure M layers, the number of layers over which signal streams are actually transmitted should be set lower than M. Herein, the layer over which signal streams are actually transmitted is referred to as an 'activated layer', and the number of activated layers is referred to as a 'transmission layer' or 'Rank'.

When a transmission Rank (hereinafter 'Rank' for short) is greater than or equal to 2 (Rank≧2), the DCW MIMO transmission scheme transmits 2 codewords without condition. However, when Rank is 1 (Rank=1), the DCW MIMO transmission scheme cannot transmit only 1 codeword. In this way, for Rank=1, SCW MIMO and DCW MIMO are equal to each other in operation, and when precoding is applied, it can be considered as an Adaptive Beamforming scheme.

In the DL control channel information for DCW MIMO shown in FIG. 4, the TF #2 407-2 and the HARQ-related information #2 409-2 are information unnecessary for Rank=1. However, the conventional mobile communication system has a channel structure that transmits the unnecessary information, i.e., TF #2 407-2 and HARQ-related information #2 409-2, even for Rank–1 transmission (i.e., Rank=1 transmission) of DCW MIMO.

Therefore, there is a need to define a structure of a downlink control channel for DCW MIMO in a MIMO system such that the structure should adapt to a change in Rank.

SUMMARY OF THE INVENTION

The present invention has been made to address at least the above problems and/or disadvantages and to provide at least the advantages described below. Accordingly, an aspect of the present invention provides an apparatus and method for transmitting and receiving a forward shared control channel in a packet data mobile communication system.

Another aspect of the present invention provides an apparatus and method for configuring a forward shared control channel, and transmitting and receiving the same in a mobile communication system that transmits packet data with multiple antennas.

An additional aspect of the present invention provides an apparatus and method for configuring a forward shared control channel in a Multiple Input Multiple Output (MIMO) system that adaptively controls a transmission layer (or Rank).

A further aspect of the present invention is to provide an apparatus and method for transmitting and receiving a downlink control channel configured by optimizing the amount of control channel information for Dual CodeWord (DCW MIMO) according to Rank in a MIMO system to which a Rank Adaptation technique is applied.

According to one aspect of the present invention, a method is provided for transmitting a downlink shared control channel including a control signal necessary for restoring a transmission data signal in a mobile communication system that transmits a data signal using multiple antennas. It is determined whether the transmission data signal is coded with more than two codewords before being transmitted. One of a first element index of a sub-codebook is selected that is configured only with a one codeword-dedicated precoding in a precoding codebook and a second element index of a sub-codebook is selected that is configured only with a more-than-two codeword-dedicated precoding, according to the determination result. A control channel is generated by including the selected element index in the precoding information. The generated control channel is mapped to a particular resource block and the mapped control channel is transmitted to a particular reception apparatus.

According to another aspect of the present invention, a method is provided for receiving a downlink shared control channel including a control signal for restoring a data signal in a mobile communication system that transmits a data signal using multiple antennas. One of a first control channel for a data signal is received that is coded with one codeword and a second control channel for a data signal is received that is coded with more than two codewords. An error from the received control channel is detected. Control information included in a control channel successfully received as a result of the error detection is detected. Data in a downlink resource block allocated to a terminal based on the detected control information is received, and the received data is decoded.

According to an additional aspect of the present invention, a method is provided for receiving a downlink shared control channel including control information for restoring a data signal in a mobile communication system that transmits a data signal using multiple antennas. A first control channel for a data signal is received. It is determined whether extension information indicating whether control information corresponds to data coded with more than two codewords is included in the first control channel. Control information included in the first control channel is detected, when the extension information is not included in the first control channel. Data in a downlink resource block allocated to a terminal based on the detected control information is received, and the received data is decoded using one codeword.

According to a further aspect of the present invention, an apparatus is provided for transmitting a packet using multiple antennas in a mobile communication system. The apparatus includes a scheduler for selecting a particular resource block over which a control channel for the packet is to be transmitted. The apparatus also includes a control channel generator for determining whether the transmission data signal is coded with more than two codewords before being transmitted, selecting one of a first element index of a sub-codebook configured only with a one codeword-dedicated precoding in a precoding codebook and a second element index of a sub-codebook configured only with a more-than-two codeword-dedicated precoding, and generating a control channel by including the selected element index in the precoding information. Additionally, the apparatus includes a mapper for mapping the generated control channel to a particular resource block selected by the scheduler.

According to another aspect of the present invention, an apparatus is provided for receiving a packet using multiple antennas in a mobile communication system. The apparatus includes a control channel receiver for receiving one of a first control channel including extension control information indicating whether the packet has undergone precoding through at least one coding codewords and also including first precoding information for the packet, and a second control channel including second precoding information being different from the first control channel according to presence/absence of the extension information. The apparatus also includes a reception combining coefficient calculator for acquiring a reception combining coefficient using one of the first precoding information and the second precoding information acquired from one of the received first control channel and second control channel. Further, the apparatus includes a data processor for decoding a packet transmitted in a particular resource block according to a reception combining coefficient provided from the reception combining coefficient calculator, and acquiring transmission data from the decoded packet.

BRIEF DESCRIPTION OF THE DRAWINGS

The above and other aspects, features and advantages of the present invention will become more apparent from the following detailed description when taken in conjunction with the accompanying drawings, in which.

DETAILED DESCRIPTION OF THE PREFERRED EMBODIMENTS

Figure 1:
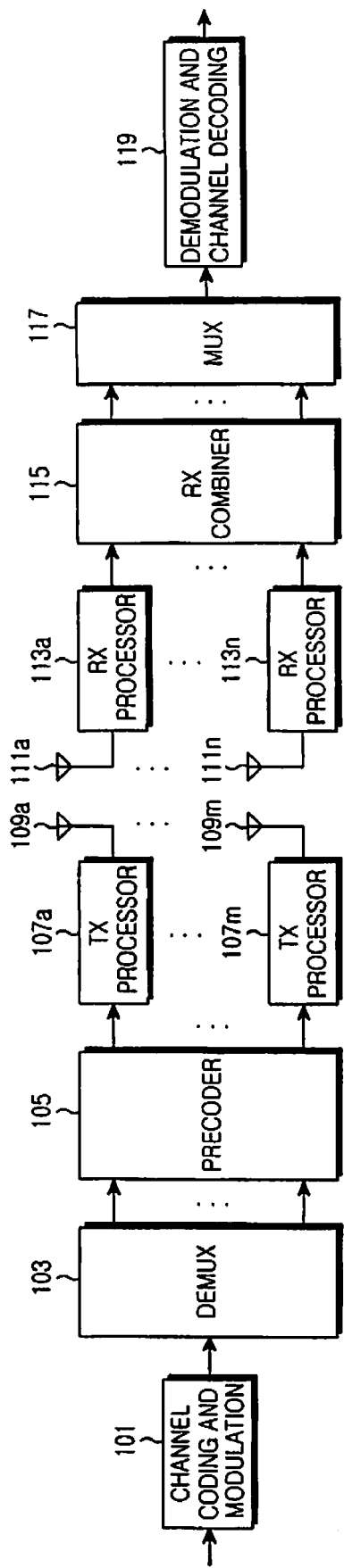
FIG. 1 is a diagram illustrating an exemplary structure of an SCW MIMO transmission/reception apparatus to which the present invention is applied.
Figure 2:
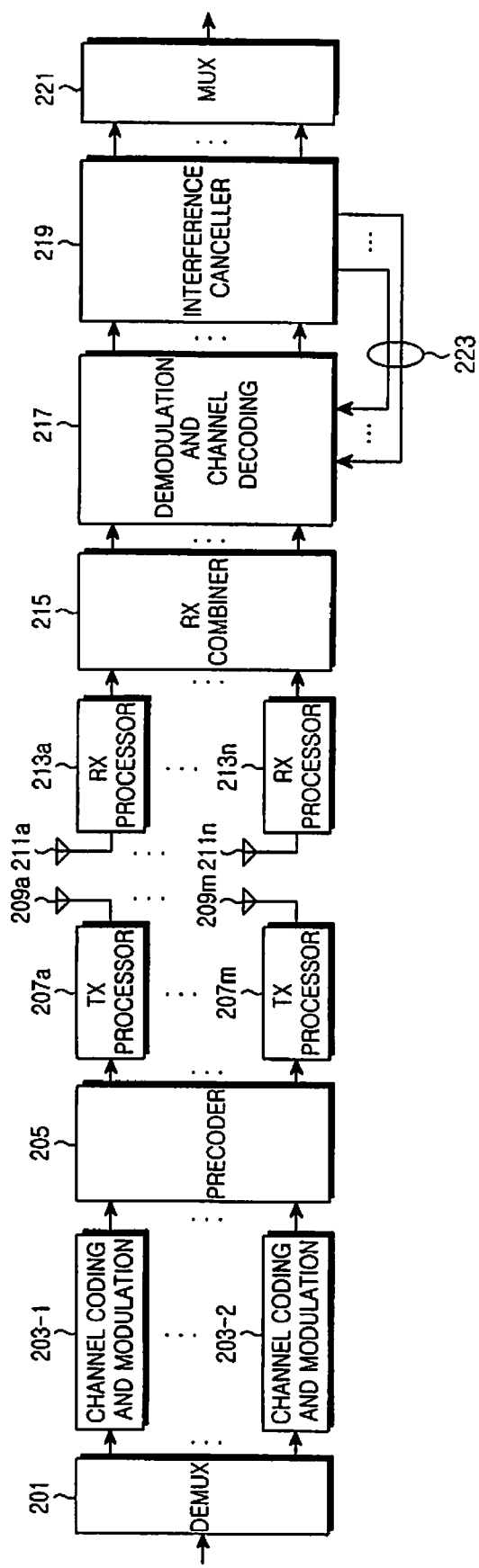
FIG. 2 is a diagram illustrating an exemplary structure of a DCW MIMO transmission/reception apparatus to which the present invention is applied.
Figure 3:
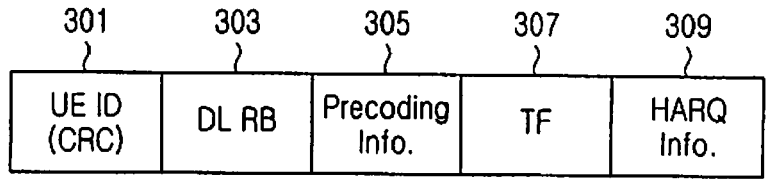
FIG. 3 is a diagram illustrating a structure of a DL control channel in SCW MIMO to which the present invention is applied.

Preferred embodiments of the present invention are described in detail with reference to the accompanying drawings. It should be noted that similar components are designated by similar reference numerals although they are illustrated in different drawings. Detailed descriptions of constructions or processes known in the art may be omitted to avoid obscuring the subject matter of the present invention.

The present invention provides a scheme for transmitting and receiving a downlink (DL) shared control channel in a mobile communication system that transmits packet data. In particular, the present invention provides a scheme for configuring a control channel by optimizing the amount of DL control channel information for DCW MIMO according to a set Rank in a MIMO system to which a Rank Adaptation technique is applied.

The present invention provides two embodiments of the scheme that configures a DL control channel for DCW MIMO according to a transmission Rank (hereinafter 'Rank') using necessary resources, to solve the conventional problems that the conventional DCW MIMO consumes resources acquired taking Rank≧2 transmission into account even though there is no need for TF #2 and HARQ-related information #2 when Rank-1 transmission (i.e., Rank=1 transmission) is performed, i.e., when only one codeword is transmitted.

According to the first embodiment, the present invention represents precoding information using an element index of a sub-codebook configured only with the Rank-1 transmission-dedicated precoding in a precoding codebook for the case where only one codeword is transmitted in a blind detection-based scheme. The first embodiment also represents precoding information using an element index of a sub-codebook configured only with the Rank≧2 transmission-dedicated precoding for the case where two codewords are transmitted, thereby preventing the unnecessary waste of resources.

According to the second embodiment, the present invention represents a precoding information part 1 using an element index of a sub-codebook configured only with the Rank-1 transmission-dedicated preceding for the case where only one codeword is transmitted in a separate coding-based scheme. The second embodiment also represents a combined part of precoding information part 1 and part 2 using an element index of a sub-codebook configured only with the Rank≧2 transmission-dedicated precoding for the case where two codewords are transmitted.

First Embodiment

Figure 5:
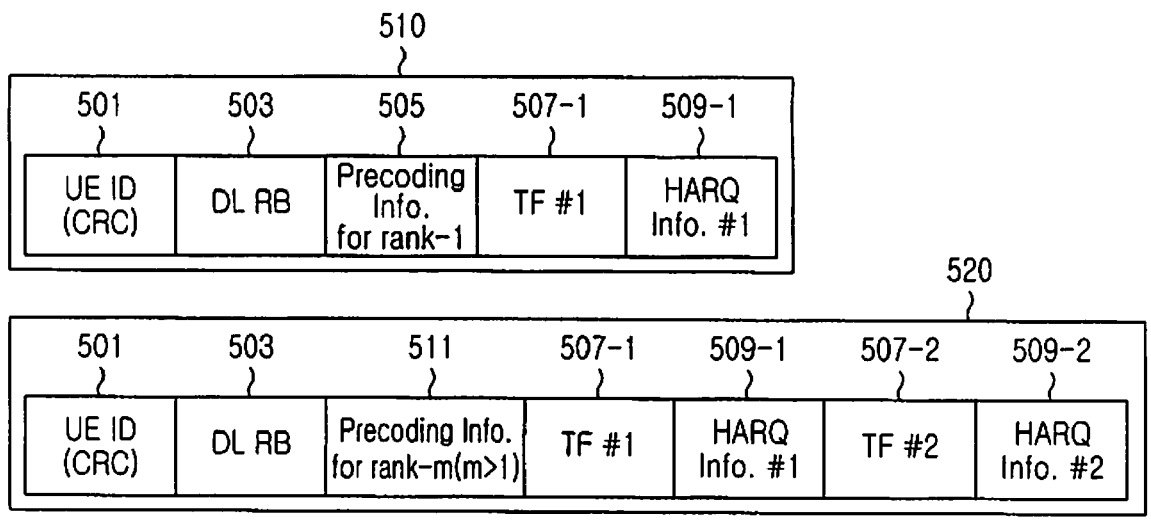
FIG. 5 is a diagram illustrating a structure of a DL control channel based on blind detection proposed by a first embodiment of the present invention.

FIG. 5 illustrates DL control channel information for DCW MIMO where blind detection is considered proposed by a first embodiment of the present invention. The term 'blind detection' as used herein refers to an operation in which if a base station transmits DL control channel information using one of multiple DL control channel information formats, a terminal receives the DL control channel information without previous information indicating DL control channel information of which format will be transmitted.

Referring to FIG. 5, there are shown a DL control channel format 510 for DCW MIMO of Rank-1 transmission and a DL control channel format 520 for DCW MIMO of Rank≧2 transmission. That is, reference numeral 510 indicates a format used when one codeword is transmitted, and reference numeral 520 indicates a format used when two codewords are transmitted. In this case, the terminal cannot determine a DL control channel of which format out of the two formats based on the Rank-1/Rank≧2 transmissions is transmitted.

Therefore, the terminal should attempt reception for both of the two types of formats. In this context, the blind detection is disadvantageous in that the receiver should attempt its reception with several types of formats, increasing the reception complexity. However, the DL control channel transmission based on blind detection is advantageous in that the amount of consumed resources is optimized for each format.

In other words, the format 510 used when one codeword is transmitted includes UE ID 501, DL RB 503, precoding information 505 for Rank-1 transmission, TF #1 507-1, and HARQ-related information #1 509-1.

A precoding codebook, in which all possible precoding methods are listed and unique indexes are attached thereto, is used as a guide for notifying which precoding method the feedback or DL control channel requests or applies.

For example, if it is assumed that a total of C precoding methods are defined in the precoding codebook, $C_1$ precoding methods among them are Rank-1 transmission-dedicated precoding methods and the remaining $(C-C_1)$ precoding methods are Rank≧2 transmission-dedicated precoding methods.

Therefore, the precoding information 505 for Rank-1 transmission in the format 510 indicates one of $C_1$ Rank-1 transmission-dedicated precodings, and needs $\lceil \log 2(C_1) \rceil$ bits for the expression, where ⌈•⌉ is a ceiling operator.

The format 520, used when two codewords are transmitted, includes UE ID 501, DL RB 503, preceding information 511 for Rank≧2 transmission, TF #1 507-1, HARQ-related information #1 509-1, TF #2 507-2, and HARQ-related information #2 509-2.

The precoding information 511 for Rank≧2 transmission indicates one of $(C-C_1)$ Rank≧2 transmission-dedicated precodings, and needs $\lceil \log 2(C-C_1) \rceil$ bits for the expression.

Figure 4:
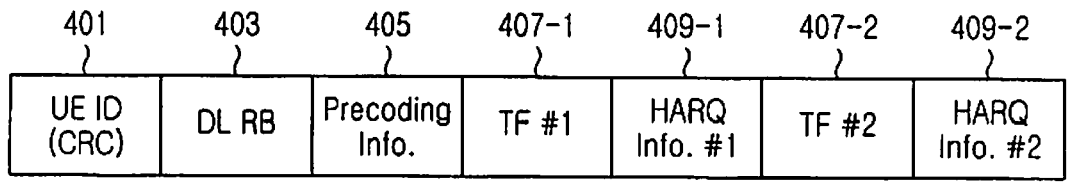
FIG. 4 is a diagram illustrating a structure of a DL control channel in DCW MIMO to which the present invention is applied.

If the precoding information 405 of FIG. 4 needs $\lceil \log 2(C) \rceil$ bits to indicate one of C precodings, the greatest amount of information is consumed in the structure of the precoding information 511 of FIG. 5 in the format 520 used when two codewords are transmitted.

That is, it can be appreciated that since $\lceil \log 2(C) \rceil \geq \lceil \log 2(C-C_1) \rceil$, the information of FIG. 5, compared with the information of FIG. 4, needs the same amount of information or needs less information.

Therefore, the present invention represents Rank-1 transmission or Rank≧2 transmission in DCW MIMO with the same or less amount of information, allowing the receiver to reduce its reception complexity.

Figure 6:
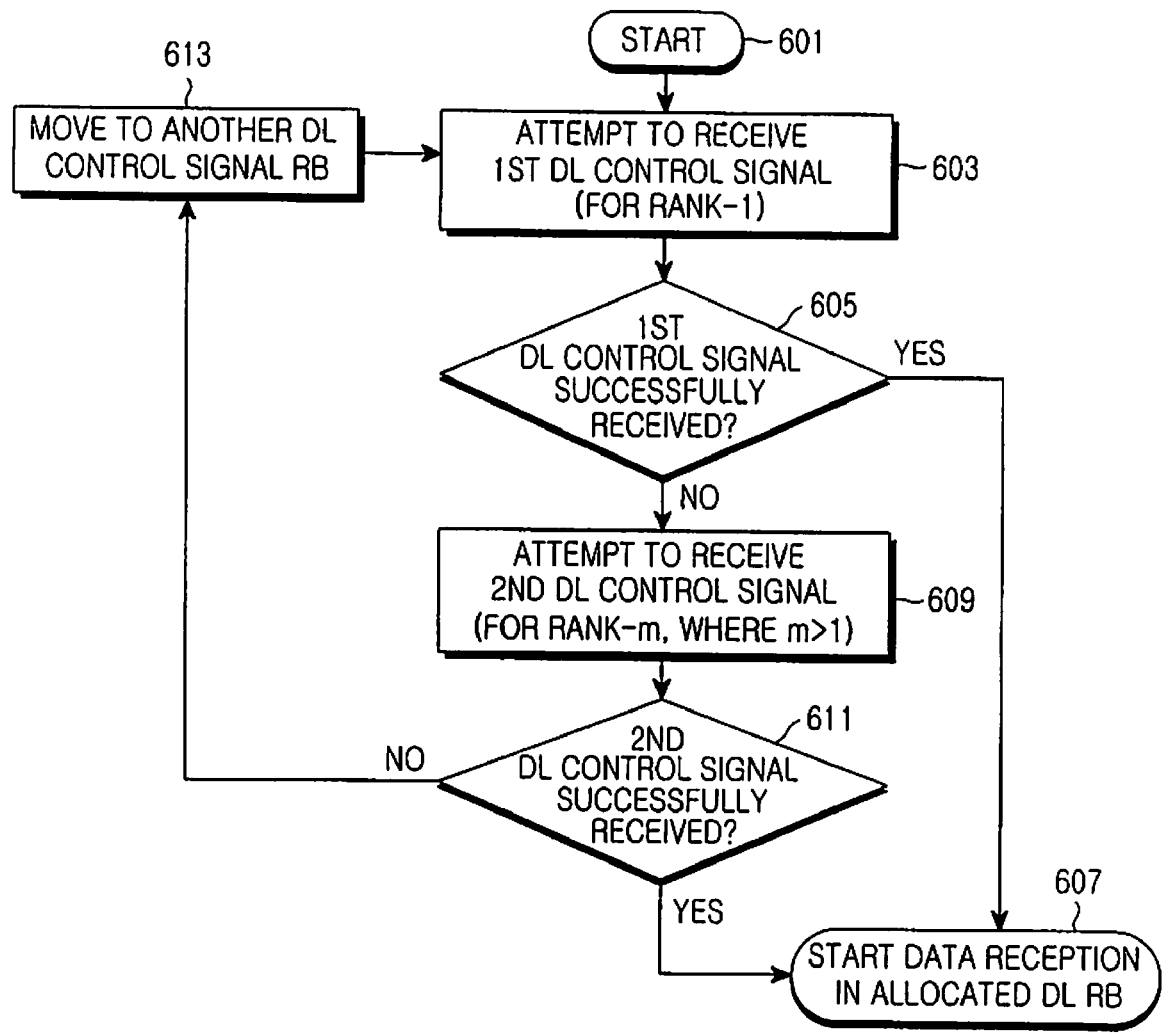
FIG. 6 is a flow diagram illustrating reception a DL control channel according to an embodiment of the present invention.

FIG. 6 illustrates a reception flow diagram of DL control channel information for DCW MIMO where blind detection is considered proposed by an embodiment of the present invention.

Referring to FIG. 6, when a terminal starts reception of a DL control signal in step 601, it attempts reception of a first DL control signal in a particular DL control signal Resource Block (RB) in step 603. The term 'RB' as used herein refers to one sub-carrier group, and the RB is composed of X consecutive sub-carriers and Y consecutive OFDM symbols, and its size is X*Y.

In addition, the term 'first DL control signal' as used herein refers to a DL control signal with the format 510 used when one codeword is transmitted, illustrated in FIG. 5.

Thereafter, in step 605, the terminal determines through CRC check whether the first DL control signal has been successfully received. If it is determined in step 605 that the first DL control signal has been successfully received, the terminal starts data reception in a DL RB allocated to the terminal based on the received information in step 607.

However, if it is determined in step 605 that the first DL control signal has not been successfully received, the terminal attempts reception of a second DL control signal in step 609. The term 'second DL control signal' as used herein refers to a DL control signal with the format 520 used when two codewords are transmitted, illustrated in FIG. 5. That is, the present invention is characterized in that since the DL control signal is designed where blind detection is considered, if the terminal fails in the reception after attempting the reception of the first DL control signal, it attempts reception of a second DL control signal.

Next, in step 611, the terminal determines through CRC check whether a second DL control signal has been successfully received. If it is determined in step 611 that the second DL control signal has been successfully received, the terminal proceeds to step 607 where it starts data reception in a DL RB allocated to the terminal based on the received information.

However, if it is determined in step 611 that the second DL control signal has not been successfully received, the terminal moves to another DL control signal RB in step 613, and then repeats the above process from the reception attempt for the first DL control signal of step 603.

Although the terminal receives the second DL control signal after receiving the first DL control signal in FIG. 6, the order is subject to change.

Therefore, according to the first embodiment, the present invention represents preceding information using an element index of a sub-codebook configured only with the Rank-1 transmission-dedicated precoding in a precoding codebook for the case where only one codeword is transmitted in the blind detection-based scheme, and represents precoding information using an element index of a sub-codebook configured only with the Rank≧2 transmission-dedicated precoding for the case where two codewords are transmitted, thereby preventing the unnecessary waste of resources.

Second Embodiment

Figure 7:
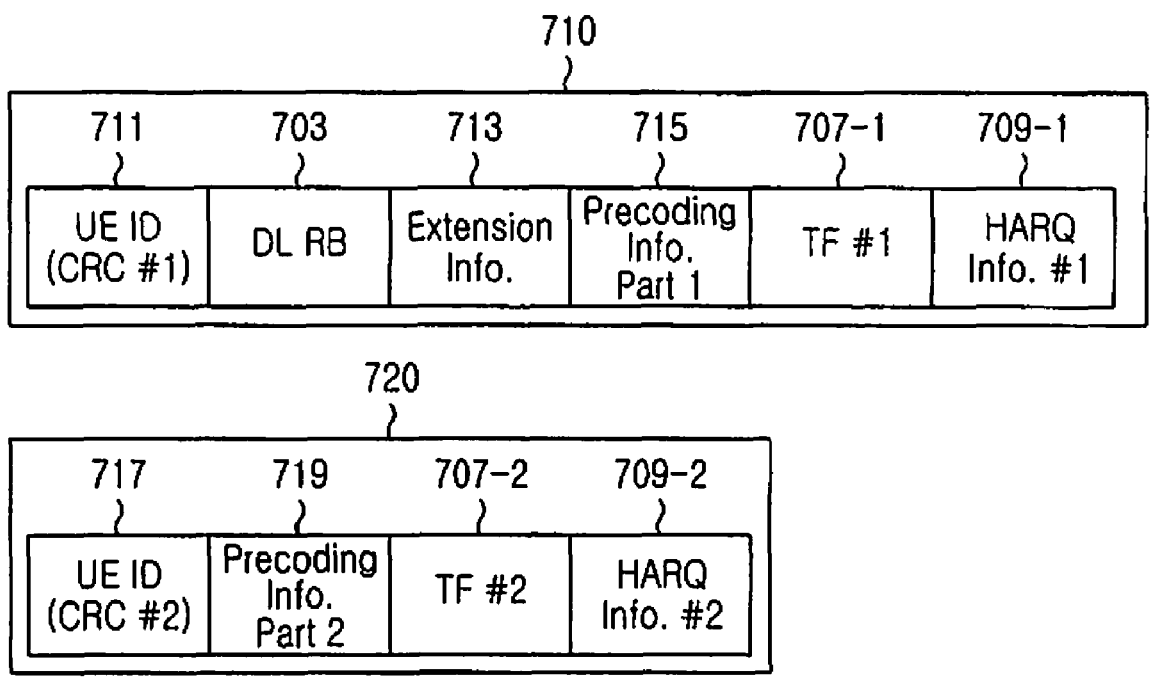
FIG. 7 is a diagram illustrating a structure of a DL control channel based on separate coding according to an embodiment of the present invention.

FIG. 7 illustrates DL control channel information for DCW MIMO where separate coding is considered proposed by the second embodiment of the present invention.

When separate coding is considered, a terminal can use a method in which it first receives control information 710 (hereinafter 'first DL control signal') used for restoring a first codeword, determines based on the control information whether there is separate extension control information 720 (hereinafter 'second DL control signal') used for restoring a second codeword. The terminal then receives the extension control information 720 if there is the extension control information 720. Therefore, the terminal can reduce the complexity for control channel reception, compared to the terminal based on the blind detection.

Referring to FIG. 7, a first DL control signal 710 is composed of UE ID 711, which is control information for restoring a first codeword, DL RB 703, extension information 713, precoding information part 1 715, TF #1 707-1, and HARQ-related information #1 709-1. When only one codeword is transmitted, data reception is possible only with the information of the first DL control signal 710.

A second DL control signal 720 is composed of UE ID 717, which is control information for restoring a second codeword, precoding information part 2 719, TF #2 707-2, and HARQ-related information #2 709-2. When two codewords are transmitted, information of not only the first DL control signal 710 but also the second DL control signal 720 is needed for data reception.

The transmission apparatus can provide information indicating whether only one codeword is transmitted or two codewords are transmitted, using the extension information 713. If only one codeword is transmitted, the extension information will indicate the no need for reception of the second DL control signal (i.e., indicate the absence of extension information), and if two codewords are transmitted, the extension information will indicate the need for reception of the second DL control signal (i.e., indicate the presence of extension information).

In the absence of the extension information, the precoding information part 1 indicates precoding information for Rank-1 transmission. In this case, as described in the example of the blind detection, the precoding information part 1 needs $\lceil \log 2(C_1) \rceil$ bits to express indication of one of $C_1$ Rank-1 transmission-dedicated precodings.

However, in the presence of the extension information, a combined part of the precoding information part 1 and the precoding information part 2 expresses indication of one of Rank≧2 transmission-dedicated precodings. Because $\lceil \log 2(C_1) \rceil$ bits are already allocated to the precoding information part 1 and $\lceil \log 2(C-C_1) \rceil$ bits are needed to express indication of one of $(C-C_1)$ Rank≧2 transmission-dedicated precodings, $\lceil \log 2(C-C_1) \rceil - \lceil \log 2(C_1) \rceil$ bits are needed for the precoding information part 2.

Based on the extension information, the precoding information part 1 is used as Rank-1 transmission-dedicated precoding information in the absence of the extension information, and is used as a part of Rank≧2 transmission-dedicated precoding information in the presence of extension information, and the remaining information is obtained from the precoding information part 2.

For example, assume that the precoding information part 1 has 2 bits, the precoding information part 2 has 3 bits, and the Rank≧2 transmission-dedicated precoding information is expressed with a total of 5 bits including 2-bit Most Significant Bit (MSB) for the precoding information part 1 and 3-bit Least Significant Bit (LSB) for the precoding information part 2.

If information '01' is written in the precoding information part 1, precoding with an index=01 among the Rank–1 transmission-dedicated precodings is in use in the presence of extension. Further, in the presence of extension, if the precoding information part 2 is additionally received and information '111' is written therein, Rank≧2 transmission-dedicated precoding information can be analyzed as information '01111' and it means that precoding with an index=01111 among the Rank≧2 transmission-dedicated precodings is in use.

The second DL control signal 720 includes UE ID 717, and if the UE ID is inserted in the form of CRC, CRC #2 can use only the bits, which are less in number than CRC #1 of UE ID 711 in the first DL control signal 710, or can be omitted. Such setting is a scheme for reducing or preventing the shortcoming that the separate coding scheme should additionally consume resources for CRC #2.

This is because if reception errors of the first DL control signal 710 and the second DL control signal 720 occur not independently of each other, bits of CRC #2 can be reduced.

Figure 8:
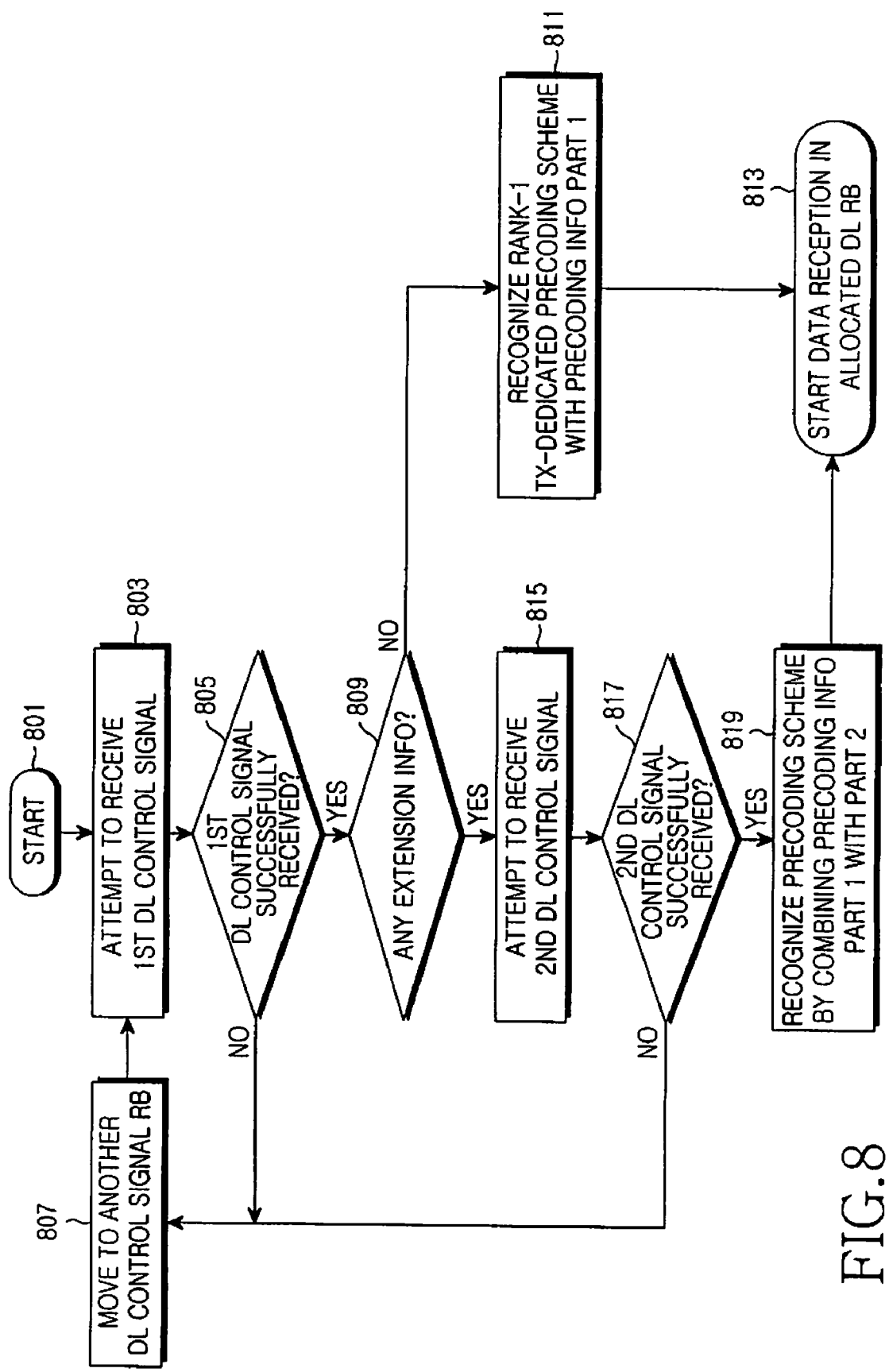
FIG. 8 is a flow diagram illustrating reception of a DL control channel according to the embodiment of the present invention of FIG. 7.

FIG. 8 illustrates a reception flow diagram of DL control channel information for DCW MIMO where separate coding is considered according to the second embodiment of the present invention.

Referring to FIG. 8, when a terminal starts reception of a DL control signal in step 801, it attempts reception of a first DL control signal in a first DL control signal RB in step 803. In step 805, the terminal determines through CRC #1 check whether the first DL control signal has been successfully received. If it is determined in step 805 through CRC #1 check that the first DL control signal has not been successfully received, the terminal moves to another DL control signal RB in step 807, and restarts from the reception attempt for the first DL control signal of step 803.

However, if it is determined in step 805 that the first DL control signal has been successfully received, the terminal determines in step 809 based on the extension information whether there is extension, i.e., whether there is a second DL control signal.

If it is determined in step 809 that there is no extension information, the terminal recognizes in step 811 which one is used as a Rank–1 transmission-dedicated precoding scheme depending on the precoding information part 1 included in the received control signal, and then proceeds to step 813 where it starts data reception in the allocated DL RB.

However, if it is determined in step 809 that there is extension information, the terminal attempts reception of the second DL control signal in step 815. Thereafter, if CRC #2 is defined in the second DL control signal, the terminal determines in step 817 through CRC #2 check whether the second DL control signal has been successfully received. If it is determined in step 817 that the second DL control signal has been successfully received, the terminal combines the precoding information part 1 of the first DL control signal with the preceding information part 2 of the second DL control signal in step 819 to recognize which one is used as a Rank≧2 transmission-dedicated preceding scheme. Thereafter, the terminal proceeds to step 813 where it starts data reception in the allocated DL RB.

However, if it is determined in step 817 that the second DL control signal has not been successfully received, the terminal moves to another DL control signal RB in step 807, and restarts from the reception attempt for the first DL control signal of step 803.

Therefore, according to the second embodiment, the present invention represents a precoding information part 1 using an element index of a sub-codebook configured only with the Rank–1 transmission-dedicated precoding for the case where only one codeword is transmitted in a separate coding-based scheme, and represents a combined part of precoding information part 1 and part 2 using an element index of a sub-codebook configured only with the Rank≧2 transmission-dedicated precoding for the case where two codewords are transmitted.

Figure 9:
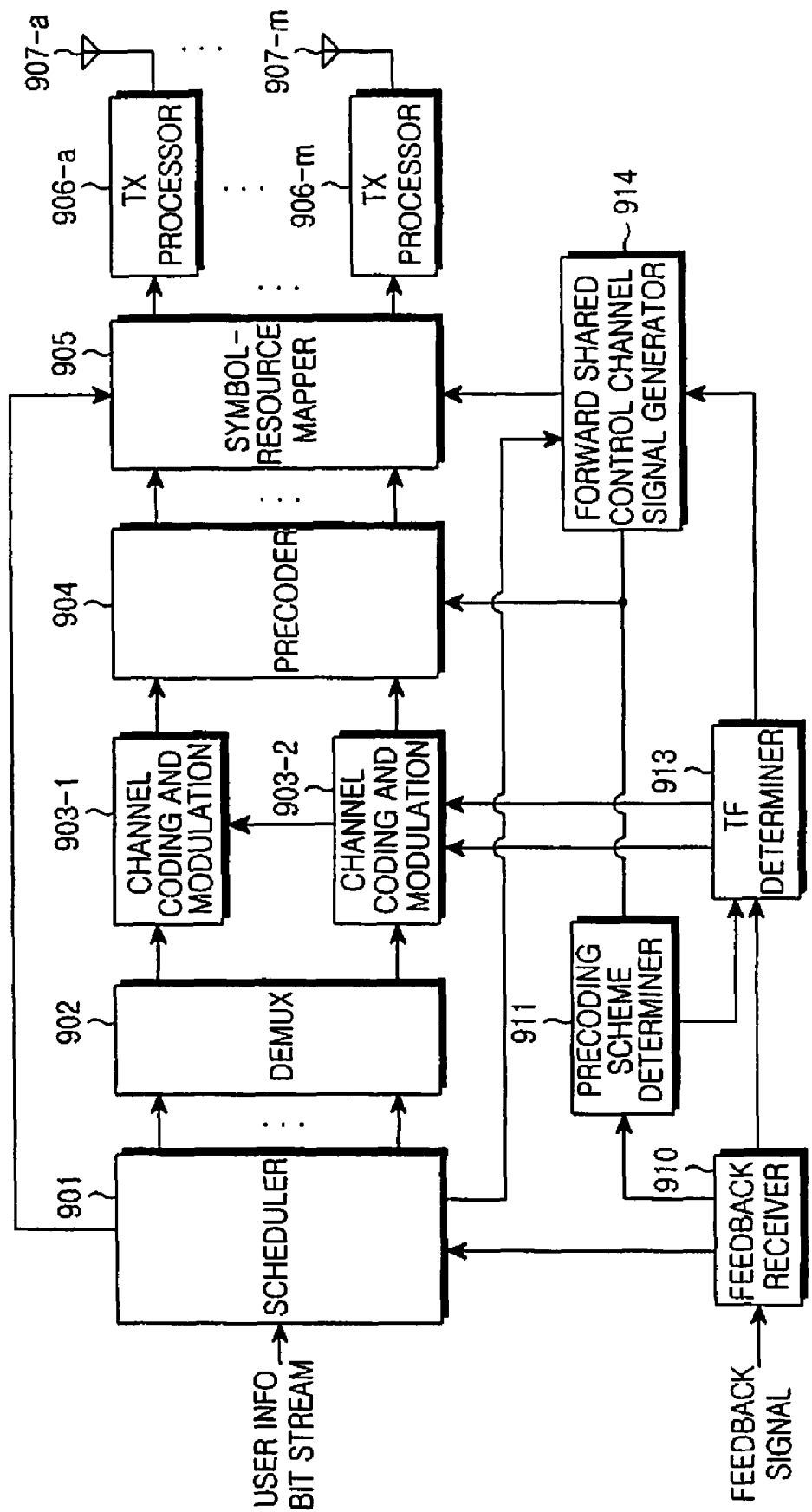
FIG. 9 is a diagram illustrating a structure of a transmission apparatus according to an embodiment of the present invention.

FIG. 9 illustrates a structure of a transmission apparatus according to an embodiment of the present invention.

Referring to FIG. 9, a scheduler 901 determines over which RB it will transmit a user information bit stream. The scheduler 901 receives and analyzes information related to a channel state of each user in the signal fed back from a feedback receiver 910, and selects an RB suitable for transmission according to the analysis result. In this case, the feedback receiver 910 receives feedback information related to preceding, and delivers the received feedback information to a precoding scheme determiner 911. A TF determiner 913 determines a TF for each signal stream based on the determined precoding scheme and channel state.

A demultiplexer 902 performs demultiplexing on each user information signal for DCW MIMO transmission. The demultiplexed signal streams undergo their associated channel coding and modulation 903-1 and 903-2 according to the DCW MIMO transmission. The channel coding and modulation is performed according to a command determined by the TF determiner 913. A modulation signal stream undergoes precoding by means of a precoder 904 that has received a command from the preceding scheme determiner 911, and the precoded signal stream is disposed in the RB determined by the scheduler 901 by means of a symbol-resource mapper 905.

A forward shared control channel signal generator (hereinafter 'control channel signal generator' for short) 914 generates a control signal based on an identifier of a receiving terminal selected by the scheduler 901, an allocated RB, a preceding scheme used, a TF, etc. The control channel signal generator 914 configures a control channel according to the scheme proposed by the first embodiment and second embodiment of the present invention.

That is, according to the first embodiment of the present invention, the control channel signal generator 914 selects one coding information from among first precoding information indicating whether a desired transmission user bit stream has undergone precoding using one coding codeword and/or second precoding information indicating whether the packet has undergone precoding using at least one distinguishable coding codewords, and configures a control channel using the selected coding information.

According to the second embodiment of the present invention, the control channel signal generator 914 generates a control channel including extension information indicating whether the packet has undergone preceding using at least one coding codewords. That is, the control channel signal generator 914 generates a first control channel including the extension information indicating whether the packet has undergone preceding using the at least one coding codewords, and the first preceding information with which the packet has undergone preceding. In addition, in regard of the extension information, the control channel signal generator 914 configures a second control channel including second preceding information being different from the first coding information.

The symbol-resource mapper 905 maps a control signal configured according to the first embodiment and second embodiment of the present invention, and a precoded symbol stream to allocated particular resources. The signals mapped to particular transmission resources in this way are transmitted via transmit antennas 907a-907m by way of transmission processors 906a-906m.

Figure 10:
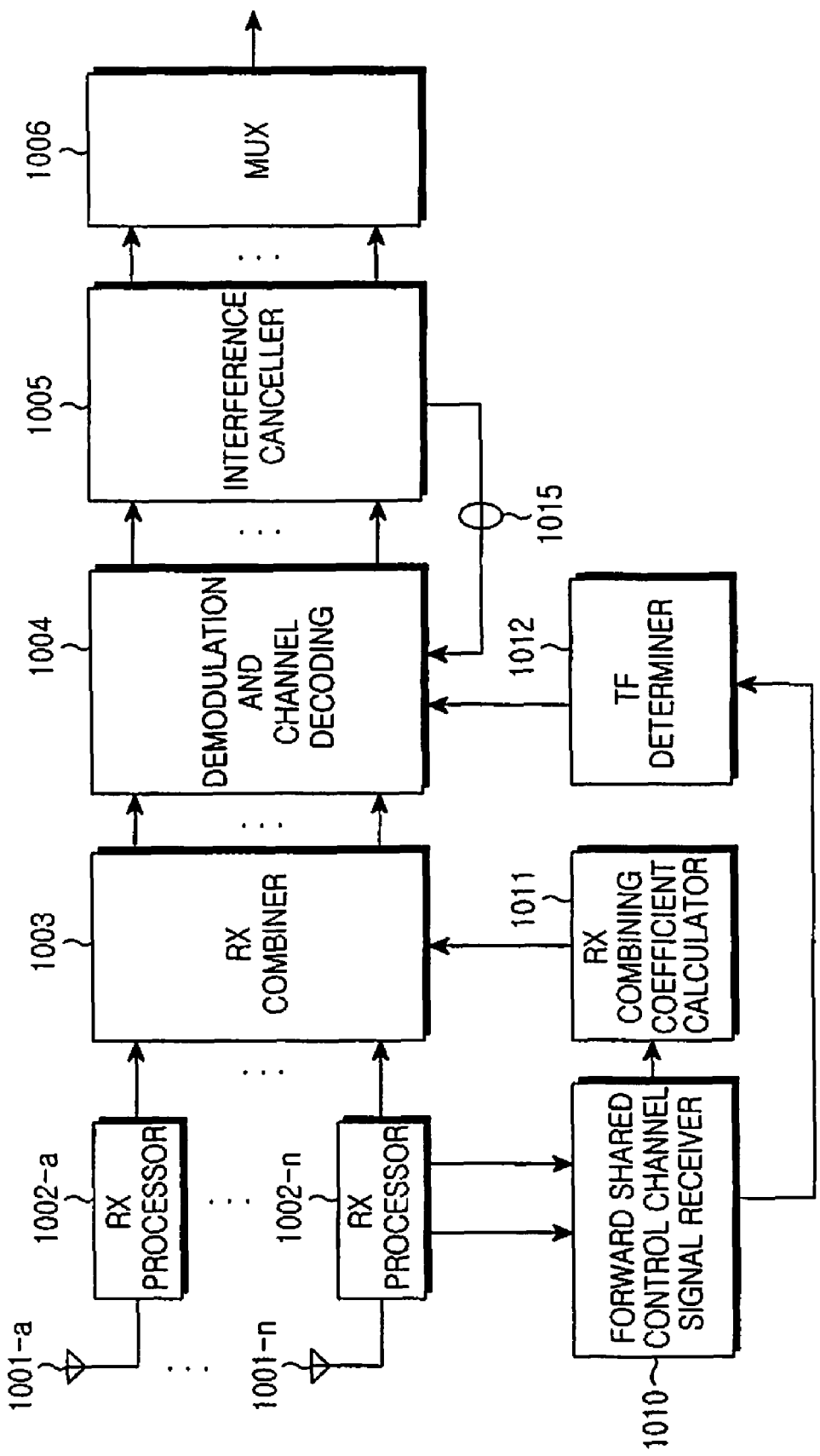
FIG. 10 is a diagram illustrating a structure of a reception apparatus according to an embodiment of the present invention.

FIG. 10 illustrates a structure of a reception apparatus according to an embodiment of the present invention.

Referring to FIG. 10, signals received at receive antennas 1001a-1001n receive data signals and control signals by way of reception processors 1002a-1002n.

A forward shared control channel signal receiver 1010 receives a control signal generated according to the first embodiment and second embodiment of the present invention, and restores control information such as precoding information, TF, etc. That is, according to the first embodiment, the forward shared control channel signal receiver 1010 checks a CRC for a received first DL control signal, and receives a data signal if the first DL control signal has been normally received. However, if the first DL control signal has not been normally received, the forward shared control channel signal receiver 1010 receives a second DL control signal.

In this case, determining whether the received control signal corresponds to the first DL control signal or the second DL control signal can be achieved depending on precoding information of the control signal. However, according to the second embodiment, the forward shared control channel signal receiver 1010 determines whether it should further receive a precoding information part 2 of the second DL control signal depending on the extension information of the received first DL control signal.

A reception combining coefficient calculator 1011 finds a reception combining coefficient based on the restored precoding information and the receiving channel state, and transfers it to a reception combiner 1003 to restore a DCW MIMO transmission signal stream.

A TF determiner 1012 delivers received TF information to a demodulation and channel decoding unit 1004. The demodulation and channel decoding unit 1004 performs a demodulation and channel decoding operation on the received data signal using the provided TF information.

When a data stream is successfully restored by the demodulation and channel decoding unit 1004, an interference canceller 1005, a block for improving reception performance, cancels interference to the restored signal. In this case, while performing demodulation and channel decoding 1004, the interference canceller 1005 repeatedly performs the interference cancellation, and the demodulation and channel decoding thereon until the interference contributed by the signal stream is fully canceled in order of first restored signal stream.

As is apparent from the foregoing description, the embodiments of the present invention propose the blind detection-based scheme and the separate coding-based scheme in the MIMO system, so as to configure the DL control channel for DCW MIMO by consuming the necessary transmission resources according to the Rank. In addition, the embodiments of the present invention optimize the amount of control information included in the configured control channel.

As a result, in configuring the downlink control channel, the embodiments of the present invention, when using at least one codeword, can prevent the unnecessary consumption of resources used for configuring the control channel, due to the use of the codewords.

While the invention has been shown and described with reference to a certain preferred embodiments thereof, it will be understood by those skilled in the art that various changes in form and details may be made therein without departing from the spirit and scope of the invention as defined by the appended claims.

What is claimed is:

1. A method for receiving a downlink shared control channel including control information for restoring a data signal in a mobile communication system that transmits a data signal using multiple antennas, the method comprising the steps of:
    receiving a first control channel for a data signal;
    determining whether extension information indicating whether control information corresponds to data coded with two or more codewords is included in the first control channel;
    detecting control information included in the first control channel, when the extension information is not included in the first control channel; and
    receiving data in a downlink resource block allocated to a terminal based on the detected control information, and decoding the received data using a single codeword.

2. The method of claim 1, wherein detecting control information comprises:
    recognizing information included in a first precoding part included in the first control channel with a first element index of a sub-codebook configured with a one codeword-dedicated precoding, when the first control channel is successfully received.

3. The method of claim 1, further comprising:
    receiving a second control channel, when the extension information is included in the first control channel;
    detecting control information included in the first control channel and the second control channel; and
    receiving data in a downlink resource block allocated to a terminal based on the detected control information, and decoding the received data using two or more codewords.

4. The method of claim 3, wherein detecting control information comprises:
    recognizing information obtained by combining a first precoding part included in the first control channel with a second precoding part included in the second control channel, with a second element index of a sub-codebook configured with a two-or-more codeword-dedicated precoding.

5. An apparatus for receiving a packet using multiple antennas in a mobile communication system, the apparatus comprising:
    a control channel receiver for receiving at least one of a first control channel having first precoding information and a second control channel having second precoding information, wherein the second control channel is received when the first control channel includes extension information indicating that the packet has undergone precoding through two or more coding codewords, and wherein the second control channel is different from the first control channel;
    a reception combining coefficient calculator for acquiring a reception combining coefficient using one of the first precoding information and the second precoding information acquired from one of the received first control channel and second control channel; and a data processor for decoding a packet transmitted in a particular resource block according to a reception combining coefficient provided from the reception combining coefficient calculator, and acquiring transmission data from the decoded packet.

6. The apparatus of claim 5, wherein upon detecting presence of the extension information, the control channel receiver allows the reception combining coefficient calculator to combine precoding information of the first control channel with precoding information of the second control channel and to generate a coding codeword used for decoding the packet according to the combined result.

7. The apparatus of claim 5, wherein the data processor checks identifier information of a particular reception apparatus receiving the packet, information on a particular resource block over which the packet is transmitted, Transport Format (TF) information of the packet, and information indicating a number of retransmissions for the packet, all of which are included in one of the first control channel and the second control channel from the control channel receiver, and decodes the packet using the generated coding codeword.

8. A method for transmitting a downlink shared control channel including a control signal necessary for restoring a transmission data signal in a mobile communication system that transmits a data signal using multiple antennas, the method comprising the steps of:

determining whether the transmission data signal is coded with two or more codewords before being transmitted;

selecting one of a first element index of a sub-codebook configured with a one codeword-dedicated precoding in a precoding codebook and a second element index of a sub-codebook configured with a two-or-more codeword-dedicated precoding, according to the determination result;

generating a control channel by including the selected element index in the precoding information;

generating at least one of a first control channel having first precoding information and a second control channel having second precoding information, wherein the second control channel is received when the first control channel includes extension information indicating that the packet has undergone precoding through two or more coding codewords, wherein the selected element index is included in at least one of the first and second precoding information, and wherein the second control channel is different from the first control channel; and mapping the generated control channel to a particular resource block and transmitting the mapped control channel to a particular reception apparatus.

9. The method of claim 8, wherein, when the transmission data signal is coded with one codeword before being transmitted, the control channel further comprises identifier information of the particular reception apparatus, downlink resource block information with which a packet is to be transmitted, Transport Format (TF) information of the packet, and information indicating a number of retransmissions for the packet.

10. The method of claim 8, wherein the number of bits required for expressing the first element index is calculated by;

number of bits for one codeword-dedicated precoding=$\lceil \log 2(C_1) \rceil$ where $\lceil \cdot \rceil$ denotes a ceiling operator, and $C_1$ denotes a number of elements of a sub-codebook configured with the one codeword-dedicated precoding.

11. The method of claim 8, wherein, when the transmission data signal is coded with more than two codewords before being transmitted, the downlink shared control channel further comprises identifier information of the particular reception apparatus, downlink resource block information with which a packet is to be transmitted, Transport Format (TF) information of two or more packets corresponding to the codewords, and information indicating a number of retransmissions for the two or more packets corresponding to the codewords.

12. The method of claim 8, wherein the number of bits required for expressing the second element index is calculated by;

number of bits for two-or-more codeword-dedicated precoding=$\lceil \log 2(C-C_1) \rceil$ where $\lceil \cdot \rceil$ denotes a ceiling operator, C denotes a number of elements of a precoding codebook configured with all possible precodings, and $C_1$ denotes a number of elements of a sub-codebook configured with the one codeword-dedicated precoding.

13. The method of claim 8, wherein the first control channel includes a first precoding information part and a control signal corresponding to a first codeword, and the second control channel includes a second precoding information part and a control signal corresponding to a second codeword, when the transmission data signal is coded with two or more codewords before being transmitted.

14. The method of claim 13, wherein generating a control channel comprises:

combining the first precoding part with the second precoding part and representing the second element index with a combined result.

15. The method of claim 14, wherein the number of bits required in the second precoding part is calculated by;

number of bits for second precoding part=$\lceil \log 2(C-C_1) \rceil - \lceil \log 2(C_1) \rceil$ where $\lceil \cdot \rceil$ denotes a ceiling operator, C denotes a number of elements of a precoding codebook configured with all possible precodings, and $C_1$ denotes a number of elements of a sub-codebook configured with the one codeword-dedicated precoding.

16. An apparatus for transmitting a packet using multiple antennas in a mobile communication system, the apparatus comprising:

a scheduler for selecting a particular resource block over which a control channel for the packet is to be transmitted;

a control channel generator for determining whether the transmission data signal is coded with two or more codewords before being transmitted, selecting one of a first element index of a sub-codebook configured with a one codeword-dedicated precoding in a precoding codebook and a second element index of a sub-codebook configured with a two-or-more codeword-dedicated precoding, and generating at least one of a first control channel having first precoding information and a second control channel having second precoding information, wherein the second control channel is received when the first control channel includes extension information indicating that the packet has undergone precoding through two or more coding codewords, wherein the selected element index is included in at least one of the first and second precoding information, and wherein the second control channel is different from the first control channel; and a mapper for mapping the generated control channel to a particular resource block selected by the scheduler.

17. The apparatus of claim 16, wherein the control channel generator calculates the number of bits required for expressing the first element index by;

number of bits for one codeword-dedicated precoding=$\lceil \log 2(C_1) \rceil$ where $\lceil \cdot \rceil$ denotes a ceiling operator, and $C_1$ denotes a number of elements of a sub-codebook configured with the one codeword-dedicated precoding.

18. The apparatus of claim 16, wherein the control channel generator calculates the number of bits required for expressing the second element index by;

number of bits for more-than-two codeword-dedicated precoding=$\lceil \log 2(C-C_1) \rceil$ where $\lceil \cdot \rceil$ denotes a ceiling operator, C denotes a number of elements of a precoding codebook configured with all possible precodings, and $C_1$ denotes a number of elements of a sub-codebook configured with the one codeword-dedicated precoding.

19. The apparatus of claim 16, wherein, when the transmission data signal is coded with two or more codewords before being transmitted, the control channel generator generates both the first control channel including a first precoding information part and a control signal corresponding to a first codeword, and the second control channel including a second precoding information part and a control signal corresponding to a second codeword.

20. The apparatus of claim 19, wherein the control channel generator combines the first precoding part with the second precoding part, and represents the second element index with the combined result.

21. The apparatus of claim 20, wherein the control channel generator calculates the number of bits required in the second precoding part using the following equation;

number of bits for second precoding part=$\lceil \log 2(C-C_1) \rceil - \lceil \log 2(C_1) \rceil$ where $\lceil \cdot \rceil$ denotes a ceiling operator, C denotes a number of elements of a precoding codebook configured with all possible precodings, and $C_1$ denotes a number of elements of a sub-codebook configured with the one codeword-dedicated precoding.

* * * * *